(12) United States Patent
Behringer et al.

(10) Patent No.: US 12,463,403 B2
(45) Date of Patent: Nov. 4, 2025

(54) SEMICONDUCTOR LASER AND LIDAR SYSTEM COMPRISING THE SEMICONDUCTOR LASER

(71) Applicant: ams-OSRAM International GmbH, Regensburg (DE)

(72) Inventors: Martin Rudolf Behringer, Regensburg (DE); Bruno Jentzsch, Regensburg (DE); Hubert Halbritter, Dietfurt-Toeging (DE)

(73) Assignee: AMS-OSRAM INTERNATIONAL GMBH, Regensburg (DE)

( * ) Notice: Subject to any disclaimer, the term of this patent is extended or adjusted under 35 U.S.C. 154(b) by 576 days.

(21) Appl. No.: 17/919,909

(22) PCT Filed: Apr. 21, 2021

(86) PCT No.: PCT/EP2021/060437
§ 371 (c)(1),
(2) Date: Oct. 19, 2022

(87) PCT Pub. No.: WO2021/214172
PCT Pub. Date: Oct. 28, 2021

(65) Prior Publication Data
US 2023/0126297 A1    Apr. 27, 2023

(30) Foreign Application Priority Data
Apr. 24, 2020    (DE) ............ 10 2020 205 253.0

(51) Int. Cl.
*H01S 5/06*    (2006.01)
*H01S 5/20*    (2006.01)
*H01S 5/40*    (2006.01)

(52) U.S. Cl.
CPC .......... *H01S 5/4043* (2013.01); *H01S 5/2022* (2013.01); *H01S 5/2027* (2013.01)

(58) Field of Classification Search
CPC .... H01S 5/0601; H01S 5/3095; H01S 5/4043; H01S 5/2022; H01S 5/2027; H01S 5/0287; H01S 5/0653–0654
See application file for complete search history.

(56) References Cited

U.S. PATENT DOCUMENTS

| 5,960,021 A | 9/1999 | De Vrieze et al. |
| 2007/0041414 A1* | 2/2007 | Albrecht ............. H01S 5/18377 |
| | | 372/45.013 |

(Continued)

FOREIGN PATENT DOCUMENTS

| CN | 110731036 A | 1/2020 |
| DE | 102017112610 A1 | 12/2018 |

(Continued)

OTHER PUBLICATIONS

Hervé, Denis, International Search Report and Written Opinion in corresponding International Application No. PCT/EP2021/060437 mailed on Jul. 28, 2021, 15 pages.

(Continued)

*Primary Examiner* — Xinning (Tom) Niu
*Assistant Examiner* — Delma R Forde
(74) *Attorney, Agent, or Firm* — MH2 Technology Law Group LLP (57) ABSTRACT

The invention relates to a semiconductor laser comprising a semiconductor layer arrangement, having an active zone for radiation generation, as well as comprising a first resonator mirror, a second resonator mirror and a resonator arranged between the first and the second resonator mirror, which ends in a direction parallel to a main surface of the semiconductor layer arrangement. The semiconductor laser also comprises a first wavelength-selective absorption element which is arranged between the semiconductor layer arrangement and the first resonator mirror.

20 Claims, 10 Drawing Sheets

(56) References Cited

U.S. PATENT DOCUMENTS

| | | | |
|---|---|---|---|
| 2009/0097519 A1* | 4/2009 | Brick | H01S 5/185 |
| | | | 372/44.01 |
| 2012/0177075 A1 | 7/2012 | Koeth | |
| 2013/0121353 A1 | 5/2013 | Kub et al. | |
| 2018/0152000 A1 | 5/2018 | Crawford et al. | |
| 2020/0203921 A1 | 6/2020 | Fuchs | |

FOREIGN PATENT DOCUMENTS

| | | |
|---|---|---|
| EP | 2043210 A2 | 4/2009 |
| JP | 5543822 A | 3/1980 |

OTHER PUBLICATIONS

Zhang Z. (Examiner), Japanese Office Action issued in corresponding Japanese Patent Application No. 2021800303854, dated Mar. 18, 2025, with English Language Translation, 13 pages.

* cited by examiner

SEMICONDUCTOR LASER AND LIDAR SYSTEM COMPRISING THE SEMICONDUCTOR LASER

CROSS-REFERENCE TO RELATED APPLICATIONS

The present application is a national stage entry from International Application No. PCT/EP2021/060437, filed on Apr. 21, 2021, published as International Publication No. WO 2021/214172 A1 on Oct. 28, 2021, and claims priority to German patent application DE 10 2020 205 253.0, filed on Apr. 24, 2020, the disclosures of all which are hereby incorporated by reference herein in their entireties.

BACKGROUND OF THE INVENTION

LIDAR ("Light Detection And Ranging") systems are increasingly being used in vehicles, for example for autonomous driving. By way of example, they are used to measure distances or to recognize objects. In the case of LIDAR systems, a narrow window for the wavelength used is usually very expedient because the sunlight as a disturbance signal can be effectively suppressed by means of a narrow-band filter in this case. Since, in customary edge emitting semiconductor lasers, the emission wavelength varies with more than 0.2 nm/K, concepts are being investigated with which the wavelength hardly varies even when there are variable temperatures, i.e. in the context of which an increased temperature stability is ensured.

The present invention addresses the problem of providing an improved semiconductor laser and also an improved LIDAR system.

SUMMARY OF THE INVENTION

In accordance with embodiments, the problem is solved by means of the subject matter of the independent patent claims. Advantageous further developments are defined in the dependent patent claims.

A semiconductor laser comprises a semiconductor layer arrangement having an active zone for generating radiation, a first resonator mirror, a second resonator mirror and a resonator arranged between the first and second resonator mirrors, said resonator extending in a direction parallel to a main surface of the semiconductor layer arrangement. The semiconductor laser furthermore comprises a first wavelength-selective absorption element arranged between the semiconductor layer arrangement and the first resonator mirror.

The semiconductor laser can furthermore comprise a second wavelength-selective absorption element arranged between the semiconductor layer arrangement and the second resonator mirror. By way of example, the first wavelength-selective absorption element can have an absorber layer arranged at a position corresponding to a position of a node of the electric field strength at a target wavelength.

In accordance with embodiments, the first wavelength-selective absorption element can furthermore have a transparent dielectric layer between the first resonator mirror and the absorber layer. The transparent dielectric layer can be dimensioned in such a way that a node of the standing wave that forms with the target wavelength is arranged in the absorber layer. In this case, a plane of the transparent dielectric layer and of the absorber layer can extend perpendicular to a light propagation direction. By way of example, the node can be arranged in the center of the absorber layer.

Furthermore, the first wavelength-selective absorption element can have a plurality of absorber layers, wherein the optical distance between centers of at least two adjacent absorber layers corresponds in each case to an integer multiple of half the target wavelength in the transparent dielectric layer arranged between the absorber layers.

In accordance with embodiments, a material of the absorber layer can contain germanium. Alternatively, the absorber layer can be realized as a tunnel junction.

By way of example, the transparent dielectric layer can contain $SiO_2$, SiN, ZnSe or a transparent III-V semiconductor material.

In accordance with embodiments, for the target wavelength at a predefined temperature a maximum gain can be present within the active zone.

By way of example, the semiconductor layer arrangement can have a multiplicity of laser elements which are arranged one above another and are connected to one another via at least one connection layer. The laser elements can be connected to one another via at least one absorbent connection layer. By way of example, the at least one absorbent connection layer can be arranged at a position corresponding to a position of a node of the electric field strength at the target wavelength. In accordance with embodiments, the at least one absorbent connection layer can be realized by a tunnel junction.

In accordance with embodiments, in the case of the semiconductor laser, lateral boundaries of the semiconductor layer arrangement run obliquely, such that generated electromagnetic radiation is reflected in the direction of the first main surface of the semiconductor layer arrangement. The first and second resonator mirrors are arranged over the first main surface of the semiconductor layer arrangement.

By way of example, the first wavelength-selective absorption element is arranged between the first main surface and the first resonator mirror. The first wavelength-selective absorption element can extend over the first main surface. The first wavelength-selective absorption element can furthermore be arranged between the first main surface and the second resonator mirror.

In the case of a semiconductor laser having oblique reflective sidewalls, wherein the semiconductor layer arrangement has a multiplicity of laser elements and also at least one absorbent connection layer, a layer thickness $s_2$ of at least one laser element as measured in a vertical direction can satisfy the relationship $s_2 = u * \lambda/2$. In this case, u is a natural number, and $\lambda$ indicates the wavelength in the semiconductor layers of the laser element.

Further embodiments relate to a LIDAR system comprising the semiconductor laser as defined above.

BRIEF DESCRIPTION OF THE DRAWINGS

The accompanying drawings serve to afford an understanding of exemplary embodiments of the invention. The drawings illustrate exemplary embodiments and together with the description serve to elucidate them. Further exemplary embodiments and numerous advantages from among those intended will become apparent directly from the following detailed description. The elements and structures shown in the drawings are not necessarily illustrated in a manner true to scale with respect to one another. Identical reference signs refer to identical or mutually corresponding elements and structures.

DETAILED DESCRIPTION

In the following detailed description, reference is made to the accompanying drawings, which form part of the disclosure and show specific exemplary embodiments for illustration purposes. In this context, a direction terminology such as "top side", "bottom", "front side", "rear side", "over", "on", "in front of", "behind", "at the front", "at the back", etc. relates to the orientation of the figures currently being described. Since the component parts of the exemplary embodiments can be positioned in different orientations, the direction terminology serves only for elucidation and is not restrictive in any way.

The description of the exemplary embodiments is not restrictive since other exemplary embodiments also exist and structural or logical changes can be made, without in that case departing from the scope defined by the patent claims. In particular, elements of exemplary embodiments described below can be combined with elements of other exemplary embodiments from among those described, provided that nothing to the contrary is evident from the context.

The lasers described here are based on semiconductor materials. Generally, the terms "wafer", "semiconductor" or "semiconductor material" used in the following description can encompass any semiconductor-based structure having a semiconductor surface. Wafer and structure should be understood as including doped and undoped semiconductors, epitaxial semiconductor layers, if appropriate carried by a base support, and further semiconductor structures. By way of example, a layer composed of a first semiconductor material can be grown on a growth substrate composed of a second semiconductor material, for example a GaAs substrate, a GaN substrate or an Si substrate, or composed of an insulating material, for example on a sapphire substrate.

Depending on the purpose of use, the semiconductor can be based on a direct or an indirect semiconductor material. Examples of semiconductor materials that are particularly suitable for generating electromagnetic radiation encompass, in particular, nitride semiconductor compounds, which can generate ultraviolet light, blue light or light of longer wavelength, for example, such as GaN, InGaN, AlN, AlGaN, AlGaInN, AlGaInBN, for example, phosphide semiconductor compounds, which can generate green light or light of longer wavelength, for example, such as GaAsP, AlGaInP, GaP, AlGaP, for example, and further semiconductor materials such as GaAs, AlGaAs, InGaAs, AlInGaAs, AlGaAsP, InGaAsP, SiC, ZnSe, ZnO, $Ga_2O_3$, diamond, hexagonal BN and combinations of the materials mentioned. The stoichiometric ratio of the compound semiconductor materials can vary. Further examples of semiconductor materials can encompass silicon, silicon-germanium and germanium. In the context of the present description, the term "semiconductor" also includes organic semiconductor materials.

The term "substrate" generally encompasses insulating, conducting or semiconductor substrates.

The terms "lateral" and "horizontal", as used in this description, are intended to describe an orientation or alignment which extends substantially parallel to a first surface of a substrate or semiconductor body. This can be the surface of a wafer or of a chip (die), for example.

The horizontal direction can lie for example in a plane perpendicular to a growth direction during the growth of layers.

The term "vertical", as used in this description, is intended to describe an orientation which extends substantially perpendicular to the first surface of a substrate or semiconductor body. The vertical direction can correspond for example to a growth direction during the growth of layers.

Figure 1A:
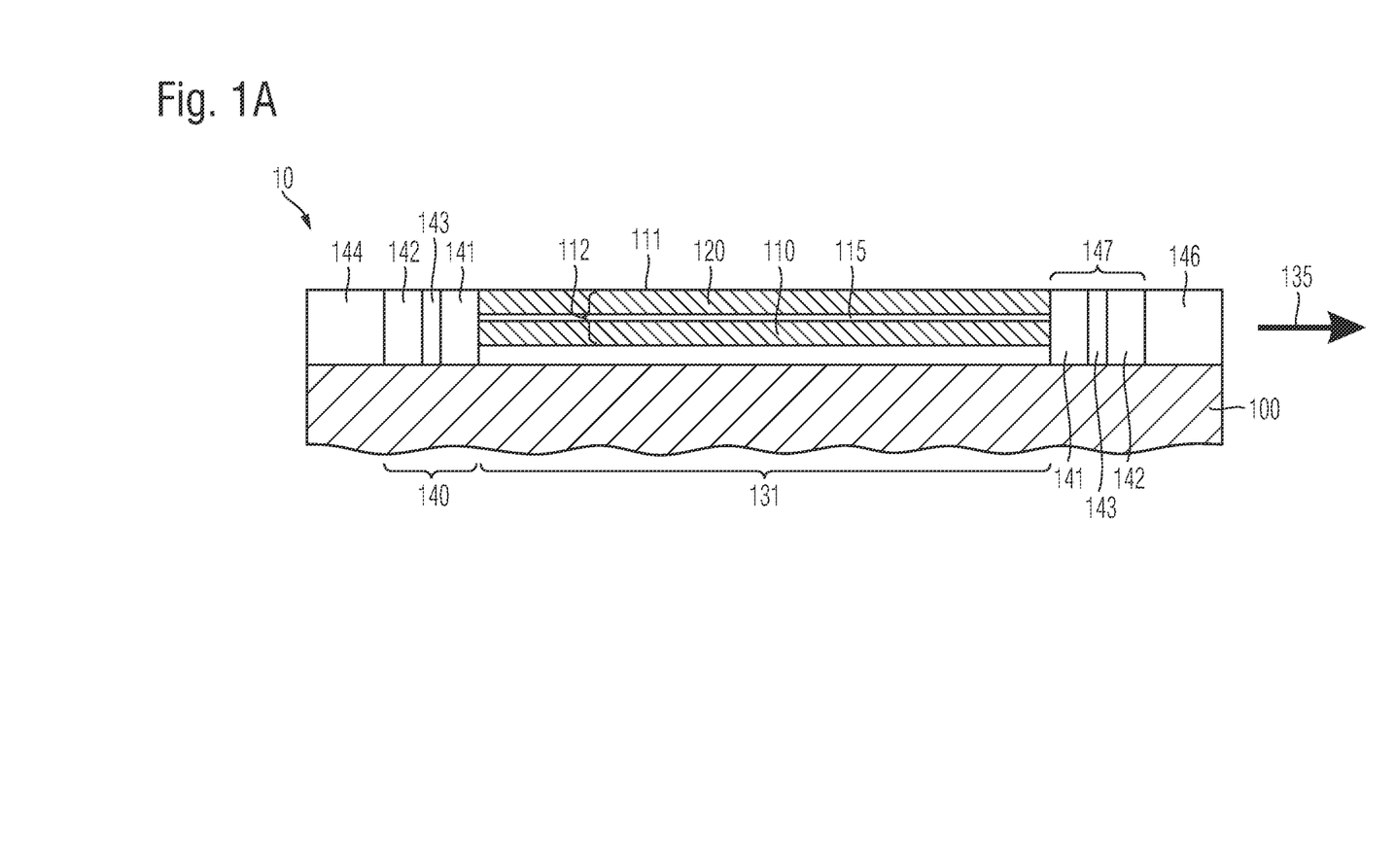
FIG. 1A illustrates elements of an edge emitting semiconductor laser in accordance with embodiments.

FIG. 1A shows components of a semiconductor laser 10 in accordance with embodiments. The semiconductor laser 10 comprises a semiconductor layer arrangement 112. The semiconductor layer arrangement 112 has an active zone 115 for generating radiation. The semiconductor laser 10 furthermore has a first resonator mirror 144, a second resonator mirror 146 and a resonator 131 arranged between the first and second resonator mirrors 144, 146. The resonator 131 extends in a direction parallel to a main surface 111 of the semiconductor layer arrangement 112. The semiconductor laser 10 furthermore has a first wavelength-selective absorption element 140 arranged between the semiconductor layer arrangement 112 and the first resonator mirror 144. In accordance with further embodiments, the semiconductor laser 10 can furthermore have a second wavelength-selective absorption element 147 between the semiconductor layer arrangement 112 and the second resonator mirror 146. The construction and the functioning of the first and second wavelength-selective absorption elements 140, 147 will be explained in more specific detail below.

The second resonator mirror 146 can have for example a lower reflectivity than the first resonator mirror 144. The generated laser radiation 135 can be coupled out via the second resonator mirror 146. Alternatively, the first resonator mirror 144 can have a lower reflectivity than the second resonator mirror 146. By way of example, the generated laser radiation 135 can also be coupled out via the first resonator mirror 144.

The semiconductor layer arrangement 112 comprises a first semiconductor layer 110 of a first conductivity type, for example of the p type, and also a second semiconductor layer 120 of a second conductivity type, for example of the n type. Further semiconductor layers can be arranged between the substrate and the first semiconductor layer 110. The substrate can be insulating or can comprise a semiconductor material. The semiconductor layers can be grown for example epitaxially over the substrate 100. An active zone 115 can be arranged between first and second semiconductor layers 110, 120. The active zone 115 can have for example a pn junction, a double heterostructure, a single quantum well (SQW) structure or a multi quantum well (MQW) structure for generating radiation. In this case, the designation "quantum well structure" does not exhibit any significance with regard to the dimensionality of the quantization. It therefore encompasses, inter alia, quantum wells, quantum wires and quantum dots and any combination of these layers.

The active zone 115 is provided by a layer or layer sequence whose main surface runs perpendicular to an extension direction of the optical resonator 131. Generally, a semiconductor laser of this type is referred to as an edge emitting semiconductor laser. However, as will be explained later with reference to FIGS. 2A to 4C, even with such a configurational form, it is possible to emit electromagnetic radiation via a main surface 111 of the semiconductor layer arrangement 112.

Furthermore, contact elements (not illustrated) can be provided in order to apply an electrical voltage to the semiconductor laser.

Figure 1B:
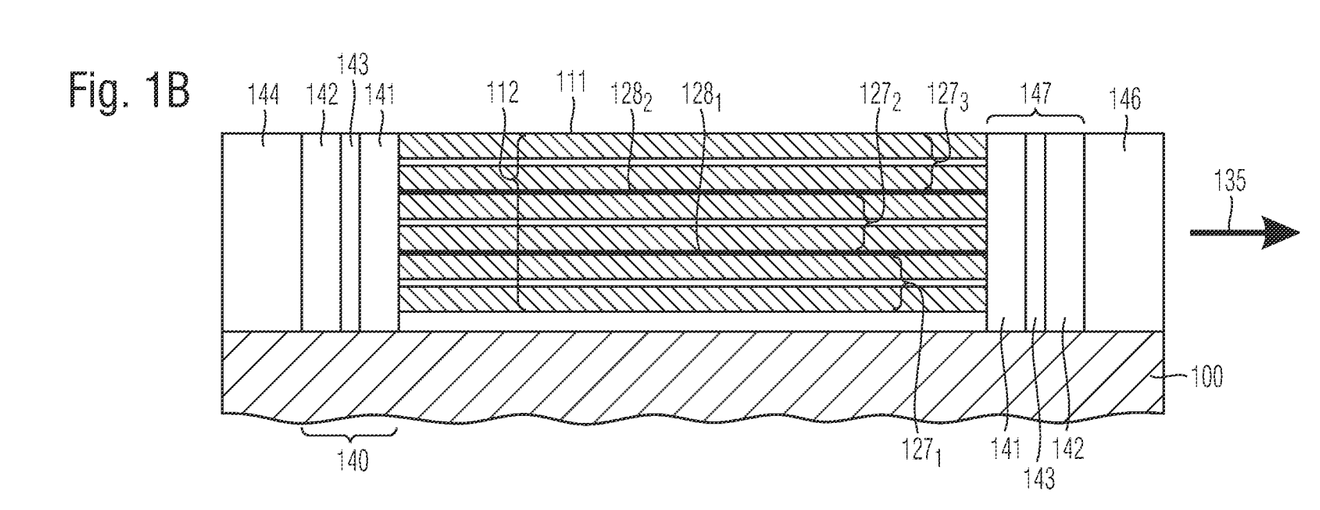
FIG. 1B shows a cross-sectional view of a semiconductor laser in accordance with further embodiments.

In the case of the arrangement shown in FIG. 1B, three laser elements $127_1$, $127_2$, $127_3$ are arranged one above another. Each of the individual laser elements has a first semiconductor layer 110, a second semiconductor layer 120 and also an active zone 115. The first semiconductor layers here can once again each be of the first conductivity type, and the second semiconductor layers 120 are each of the second conductivity type. The individual laser elements $127_1$, $127_2$ and $127_3$ are each connected to one another via connection layers $128_1$, $128_2$. The connection layers $128_1$, $128_2$ can each be tunnel junctions, such that an electrical connection is made possible.

Generally, in the context of the present application, the term "tunnel junction" encompasses a sequence of very highly doped semiconductor layers of a first and a second conductivity type. By way of example, a first highly doped layer of the first conductivity type can be arranged in a manner adjoining and in contact with the first semiconductor layer 110 of the first conductivity type of the laser element $127_1$, $127_2$, $127_3$. Furthermore, a second highly doped layer of the second conductivity type can be arranged in a manner adjoining and in contact with the second semiconductor layer 120 of the second conductivity type of the laser element $127_1$, $127_2$, $127_3$. Optionally, intermediate layers can additionally be arranged between the highly doped layers. The sequence of very highly doped layers of the first and second conductivity types and optionally the intermediate layer constitute a tunnel diode. The respective laser elements $127_1$, $127_2$ and $127_3$ can be connected in series using these tunnel diodes.

As in FIG. 1A, a first resonator mirror 144 and a second resonator mirror 146 are provided here as well. Furthermore, the semiconductor laser 10 comprises a first absorption element 140 between the semiconductor layer arrangement 112 and the first resonator mirror 144. The semiconductor laser 10 optionally furthermore comprises a second absorption element 147 between the semiconductor layer arrangement 112 and the second resonator mirror 146.

It goes without saying that the number of laser elements $127_1$, $127_2$, $127_3$ can be different than three.

Figure 1C:
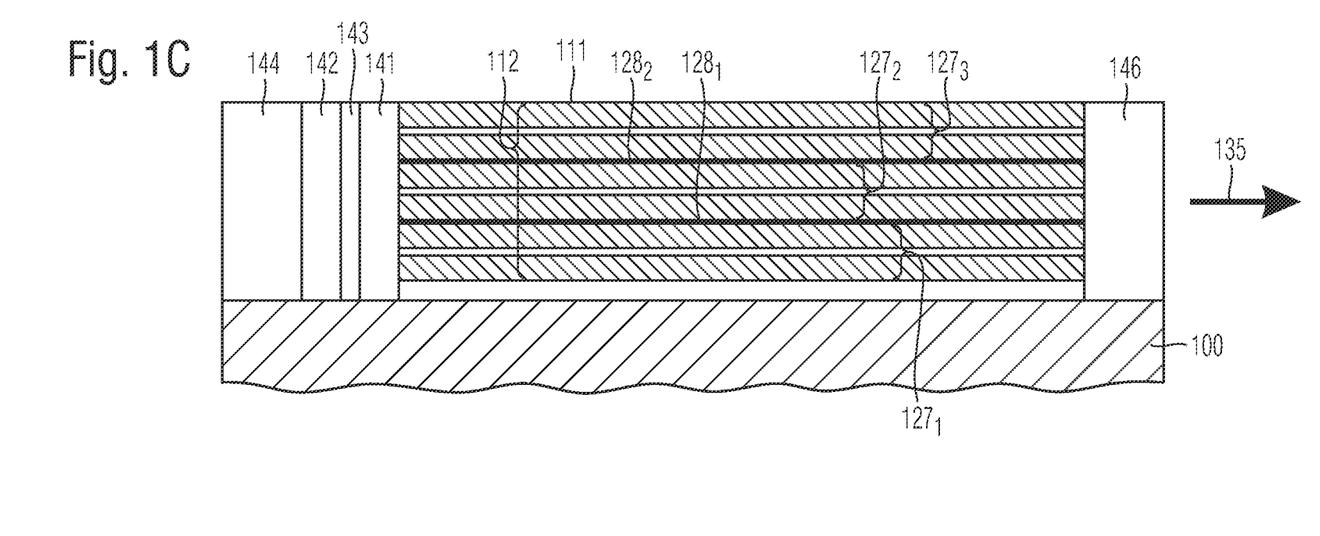
FIG. 1C shows a cross-sectional view of a semiconductor laser in accordance with further embodiments.

In accordance with embodiments shown in FIG. 1C, the first absorption element 140 can also be arranged only on one side of the semiconductor layer arrangement 112, for example between the semiconductor layer arrangement 112 and the first resonator mirror 144. In accordance with embodiments, generated electromagnetic radiation can be coupled out via the second resonator mirror 146. In accordance with further embodiments, the generated electromagnetic radiation can alternatively also be coupled out via the first resonator mirror 144. That is to say that, in this case, the first absorption element 140 is arranged on the light output coupling side of the semiconductor laser 10.

Figure 1D:
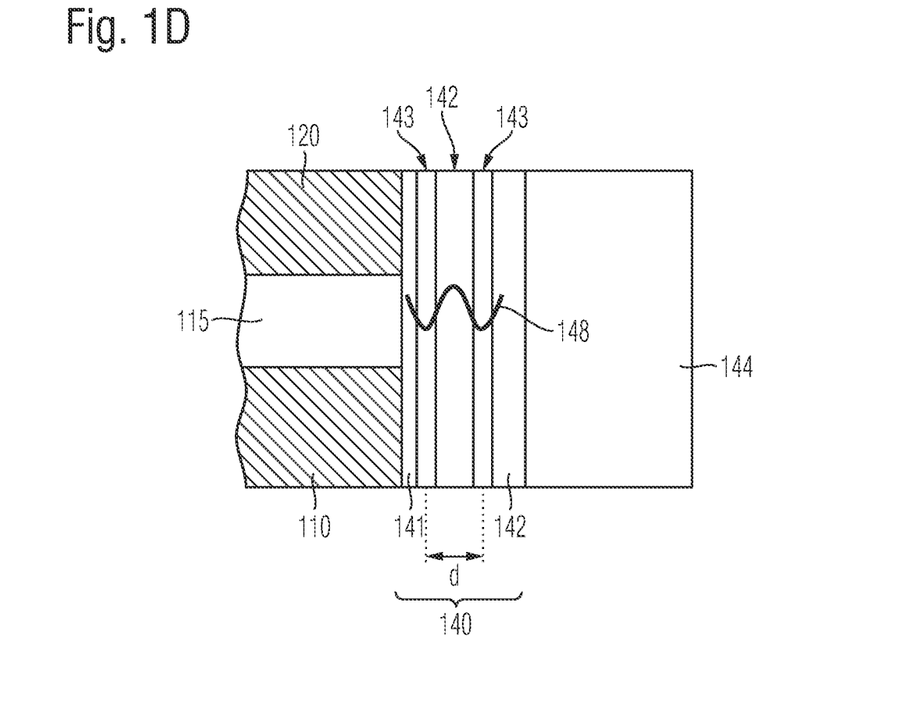
FIG. 1D shows a cross-sectional view of a detail of a semiconductor laser in accordance with embodiments.

The construction of the first absorption element 140 is described in greater detail below with reference to FIG. 1D. The description applies, mutatis mutandis, to the second absorption element 147. If a semiconductor laser 10 has a first and a second absorption element 140, 147, then these can have an identical construction or a mutually different construction.

The first absorption element 140 has one or more absorber layers 143. The absorber layer 143 is for example a thin, greatly absorbent layer. A layer thickness of the absorber layer 143 can be for example less than 20 nm, for example less than 5 nm. A material of the absorber layer 143 can be germanium, for example. The absorber layer 143 can furthermore comprise a tunnel junction or some other greatly absorbent layer. By way of example, the absorber layer 143 can contain a few monolayers of germanium. An optically transparent insulator layer 141, for example a transparent III-V semiconductor layer, or a layer comprising $SiO_2$, SiN or a mixture of these materials, can be arranged between the semiconductor layer arrangement 112 and the absorber layer 143. The transparent insulator layer 141 is provided for example in order to avoid electrical short circuits between the absorber layer 143 and the semiconductor layer arrangement 112.

The transparent dielectric layer 142 arranged between the absorber layer 143 and the first resonator mirror 144 is constructed for example from a material constituted in such a way that the product of refractive index and layer thickness changes little with temperature. By way of example, the product of refractive index and layer thickness changes by less than 0.1 nm/K. Generally, the dielectric layer 142 can for example contain a single layer or alternatively be composed of a plurality of layers. The optical thickness of the transparent dielectric layer 142 is dimensioned for example in such a way that a node of the standing wave that forms with the target wavelength is arranged in the absorber layer 143, for example in the center of the absorber layer 143. By way of example, the transparent dielectric layer 142 can comprise a transparent III-V semiconductor layer, a ZnSe layer or a layer comprising $SiO_2$, SiN or a mixture of these materials.

A plurality of sequences of absorber layer 143 and transparent dielectric layer 142 can be arranged between the semiconductor layer arrangement 112 and the first resonator mirror 144. In this case, for example, the dielectric layer 142 arranged between adjacent absorber layers 143 is dimensioned in such a way that the distance d or the optical distance between the respective centers of adjacent absorber layers 143 corresponds to an integer multiple of half the effective target wavelength of the laser light. The term "effective wavelength" relates here to the wavelength in the associated propagation medium, i.e. in the transparent layer. Furthermore, the absorption element is adapted such that all absorber layers 130 are arranged at positions of the intensity minima of the primary standing wave 148.

In the case of such an arrangement of the absorption element having the transparent insulator layer 141, an absorber layer 143 and a further transparent dielectric layer 142, and the first or second resonator mirror 144, 146, for example at the target wavelength of the semiconductor laser a node of the standing wave 148 that forms is located at the position of the absorber layer 143. By way of example, the node can be positioned in each case in the center of the absorber layer 143. The term "node" here denotes the region at which the electric field strength of the standing wave is zero. FIG. 1D illustrates the magnitude of the electric field strength of the standing wave 148. That is to say that the illustrated minima respectively correspond to the nodes of the standing wave.

In this way, when the semiconductor component is operated at the target wavelength, no absorption occurs in the absorber layer 143. If the wavelength shifts as the temperature increases, then increased absorption for this wavelength occurs in the absorber layer 143. Specifically, in this case, now it is no longer the nodes but rather regions having a finite field strength, i.e. a field strength different than zero, that are located in the region of the absorber layer 143. Therefore, these modes are attenuated and only those modes form which involve the nodes of the electric field strength being present at the position of the absorber layer 143. By virtue of the fact that at the target wavelength the nodes of the standing wave 148 that forms are present at the position of the absorber layer 143, the electric field strength at the position of the absorber layer 143 is equal to zero. Accordingly, this light is not absorbed by the absorber layer 143. In this way, it is possible to ensure that the semiconductor laser 10 emits electromagnetic radiation with the target wavelength. The effect can be intensified by the absorption element 140, 147 having in each case a plurality of absorber layers 143 that are positioned as described above.

In this way, a wavelength-selective absorption element is provided which, in combination with a resonator mirror, enables wavelength-selective reflection. By way of example, the resonator mirror can have a non-wavelength-dependent reflectivity. In accordance with further embodiments, a resonator mirror having a wavelength-dependent reflectivity can also be combined with a wavelength-selective absorption element. By way of example, the first and/or the second resonator mirror 144, 146 can be realized as a metallic mirror, for example composed of gold. In accordance with further embodiments, the first and/or the second resonator mirror 144, 146 can be realized as a dielectric mirror. Generally, the term "dielectric mirror" encompasses any arrangement which reflects incident electromagnetic radiation to a large degree (for example >90%) and is not conductive. By way of example, a dielectric mirror layer can be formed by a sequence of very thin dielectric layers each having different refractive indices. By way of example, the layers can alternately have a high refractive index (e.g. n>1.7) and a low refractive index (e.g. n<1.7) and can be embodied as a Bragg reflector.

The concept described is also applicable to semiconductor lasers in which at least one part of the resonator extends in a direction parallel to a main surface 111 of the semiconductor layer arrangement 112, but the radiation 135 is emitted via the first main surface 111 of the semiconductor layer arrangement 112.

Figure 2A:
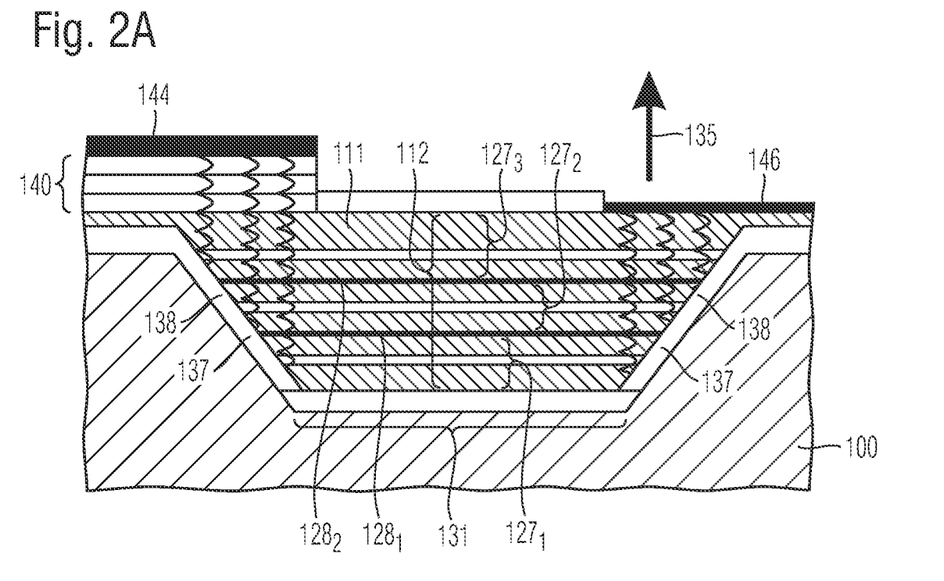
FIG. 2A shows a cross-sectional view of a surface emitting semiconductor laser in accordance with embodiments.

FIG. 2A shows a surface emitting semiconductor laser comprising a resonator 131 running parallel to the main surface 111 in accordance with embodiments. As is shown in FIG. 2A, the end faces of the semiconductor layer arrangement 112 are etched at an angle of 45°. A dielectric layer 138 can be applied in a manner adjoining the obliquely etched sidewalls. In accordance with further embodiments, a dielectric carrier substrate 100 can also directly adjoin the obliquely etched sidewalls. On account of the difference in refractive index between the semiconductor material of the semiconductor layer arrangement 112 and the dielectric layer 138, total internal reflection takes place at each of the sidewalls. As a result, the oblique sidewalls of the semiconductor layer arrangement 112 act as specularly reflective sidewalls 137. As a consequence, the electromagnetic radiation generated is reflected in the direction of the first main surface 111 of the semiconductor layer arrangement 112. The first and second resonator mirrors 144, 146 are arranged over the first main surface 111.

The laser light is reflected in each case by the first resonator mirror 144 and the second resonator mirror 146 into the semiconductor layer arrangement having the active zone 115. By way of example, a wavelength-dependent absorption element 140 can be arranged between the semiconductor layer arrangement 112 and the first resonator mirror 144 in the manner described above. As described above, here as well a thin absorbent layer is incorporated between layers of dielectric material. The position of the absorbent layers corresponds to the position of the nodes of the standing waves that form between the specularly reflective sidewall 137 and the first resonator mirror 144. In FIG. 2A, a plurality of laser elements $127_1$, $127_2$ and $127_3$ are stacked one above another and are connected to one another via connection layers $128_1$, $128_2$. The connection layers can once again be tunnel junctions. The carrier substrate 100 is structured in a manner corresponding to the shape of the semiconductor layer arrangement. The second resonator mirror 146 has for example a lower reflectivity than the first resonator mirror 144. Correspondingly, electromagnetic radiation 135 generated is coupled out via the first main surface 111 at the position of the second resonator mirror 146.

Figure 2B:
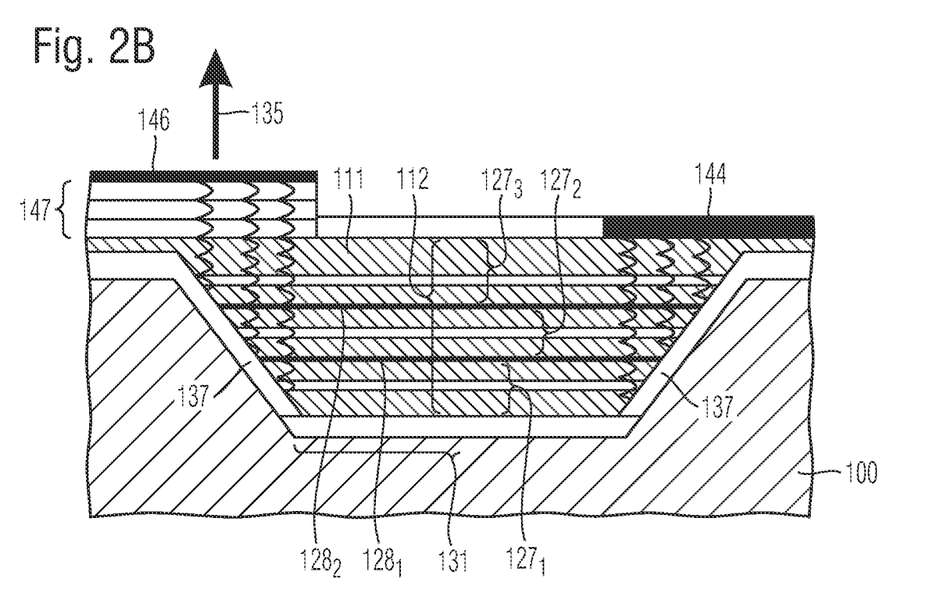
FIG. 2B shows a cross-sectional view of a surface emitting semiconductor laser in accordance with further embodiments.

In accordance with embodiments illustrated in FIG. 2B, the absorption element 140 can also be arranged between the second resonator mirror having a lower reflectivity and the semiconductor layer arrangement 112. By way of example, in this case, the first resonator mirror 144 can adjoin the semiconductor layer arrangement 112 without an interposed absorption element 140. In this case, the emitted electromagnetic radiation 135, after passing through the absorption element 140 and the second resonator mirror 146, is emitted via a region of the first main surface 111 of the semiconductor layer arrangement 112. Further components of the semiconductor laser in FIG. 2B are similar or identical to those which have been described with reference to FIG. 2A.

Figure 3A:
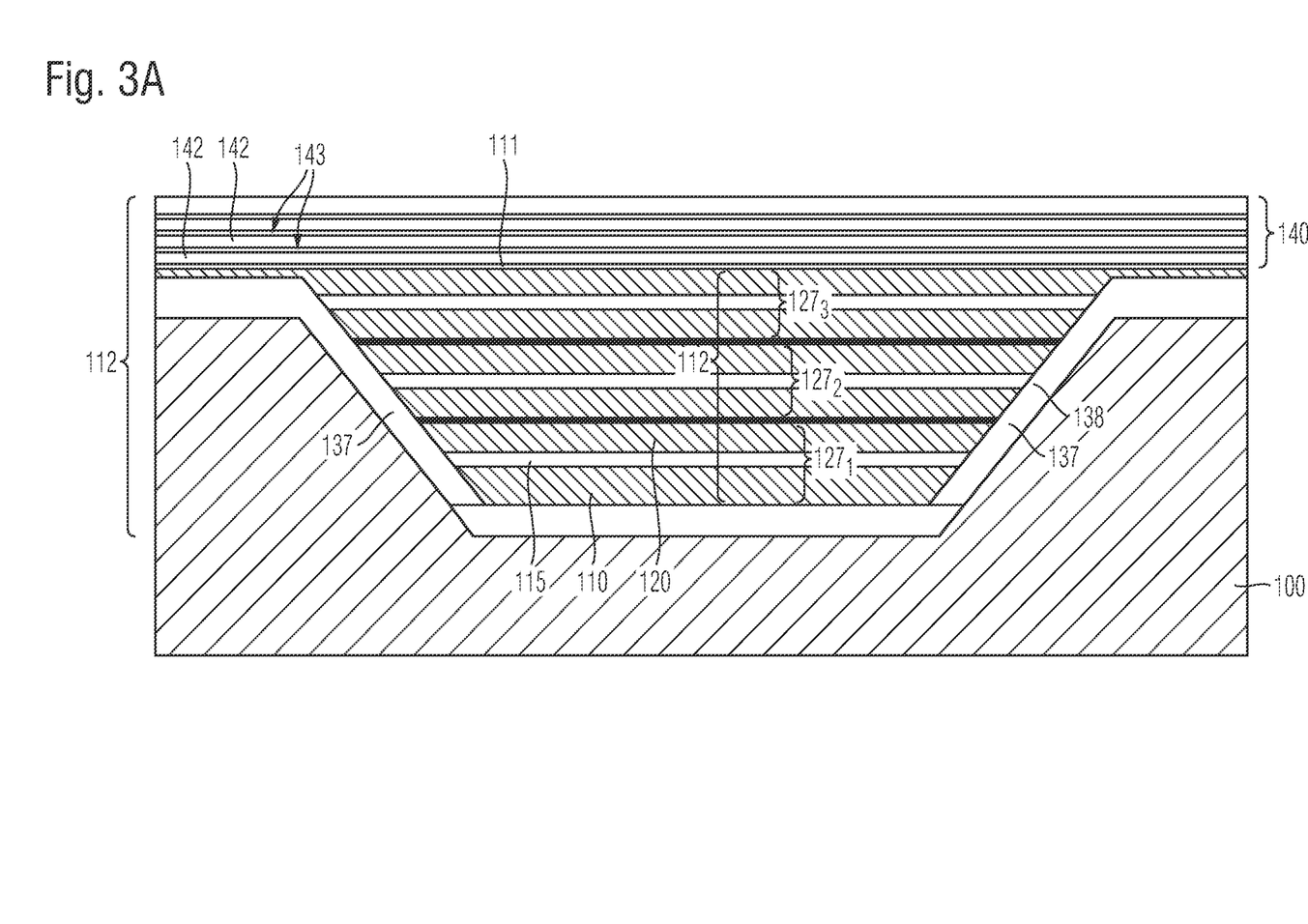
FIG. 3A illustrates components of a semiconductor laser in accordance with embodiments.

FIG. 3A shows general components of the semiconductor laser described in FIGS. 2A, 5B, 3B, 4A, 4B, 4C, for example, in the case of which laser at least one part of the resonator extends in a direction parallel to a main surface 111 of the semiconductor layer arrangement 112 and the electromagnetic radiation generated is emitted via the first main surface 111.

The semiconductor laser in accordance with embodiments illustrated in FIGS. 2A, 2B, 3B, 4A, 4B, 4C, for example, has a plurality of laser elements $127_1$, $127_2$ and $127_3$ arranged one above another. The laser elements are connected to one another and electrically connected in series, for example, via connection layers $128_1$, $128_2$. By way of example, each of the laser elements $127_1$, $127_2$, $127_3$ can have a first semiconductor layer 110 of a first conductivity type, for example p-conducting, a second semiconductor layer 120 of a second conductivity type, for example n-conducting, and an active zone 115. The connection layers $128_1$, $128_2$ can each be realized as tunnel junctions. The sidewalls of the semiconductor layer of a semiconductor layer arrangement 112 are etched at an angle of 45° and are covered with a dielectric layer 138. On account of the difference in refractive index between the semiconductor layer and the adjoining dielectric layer, the interface between semiconductor material and dielectric layer acts as a total internal reflection mirror.

Emitted radiation is thus emitted in a vertical direction via the first main surface 111 of the semiconductor layer stack 112. The absorption element 140 has a multiplicity of absorber layers 143 and transparent dielectric layers 142 arranged between the absorber layers 143. The layer thickness of the transparent dielectric layers 142 is dimensioned in such a way that the standing waves that form in each case between the reflective sidewall 137 and the adjoining resonator mirror (not illustrated in FIG. 3A) have nodes whose position is located at the position of the absorber layers 143, as has also been described above with reference to FIG. 1D. This ensures that no absorption by the absorber layers 143 takes place at the target wavelength. In the case of a shift in the wavelength, absorption by the absorber layers 143 takes place, such that these components are attenuated and laser radiation with a stable wavelength forms.

Figure 3B:
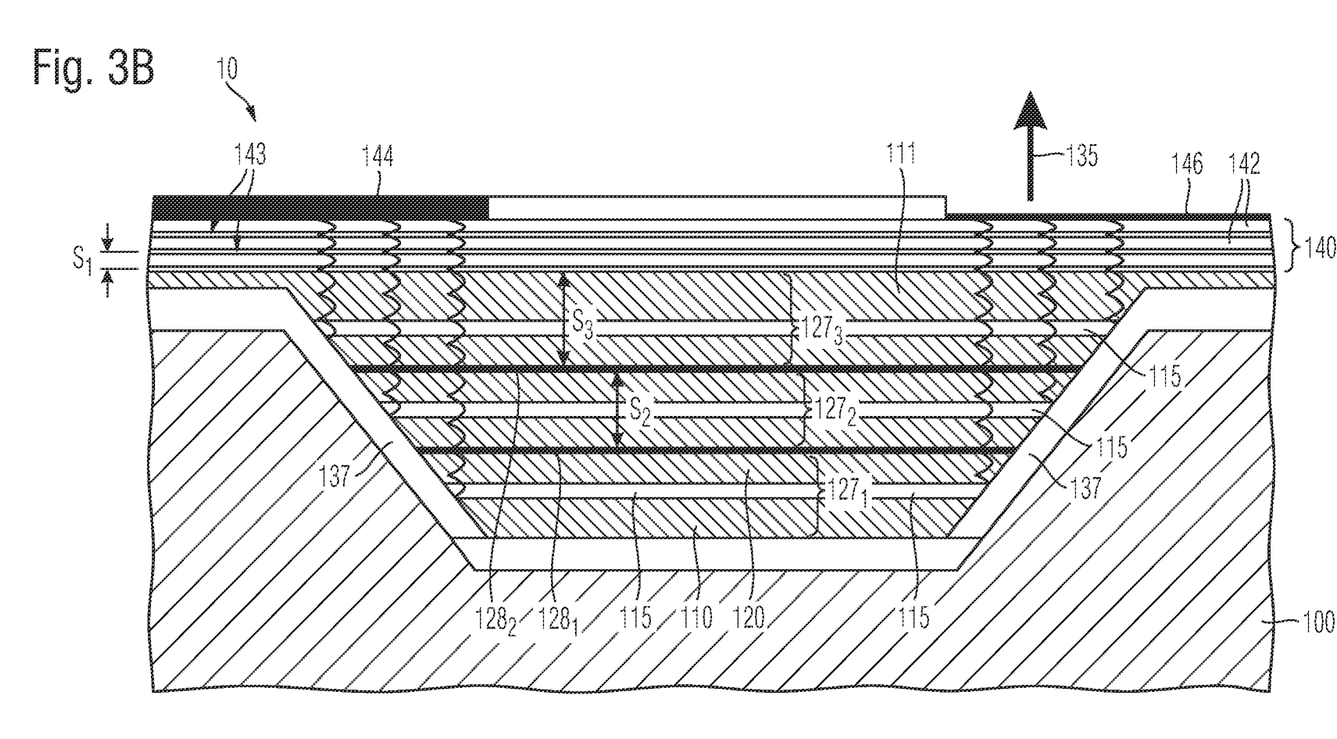
FIG. 3B shows a cross-sectional view of a semiconductor laser in accordance with embodiments.

FIG. 3B shows a cross-sectional view of a semiconductor laser 10 for elucidating further components of the semiconductor laser shown in FIG. 3A. The resonator 131 having the active zone 115 extends in a direction parallel to the first main surface 111, and the radiation is emitted via the first main surface 111 of the semiconductor layer arrangement 112. As is illustrated in FIG. 3B, a common absorption element 140 is arranged over the first main surface 111 of the semiconductor layer arrangement 112. The common absorption element 140 is thus arranged both between the first resonator mirror 144 and the semiconductor layer arrangement 112 and between the second resonator mirror 146 and the semiconductor layer arrangement 112. The first and second resonator mirrors 144 and 146 are each arranged over the first main surface of the semiconductor layer arrangement 112. The first and second resonator mirrors each extend in a plane parallel to the first main surface 111.

Components illustrated in FIG. 3A are thus illustrated in greater detail in FIG. 3B. The layer thickness of the transparent dielectric layers 142 of the absorption element 140 is $s_1$, here the applicable relationship being $s_1=m*\lambda/2$, where m is a natural number. The active zones 115 of each of the laser elements $127_1$, $127_2$, $127_3$ are arranged at positions such that the maximum of the standing wave that forms is arranged in each case at the position of the active zone 115. This ensures that the standing wave that forms in the resonator 131 is guided in each case in the active zone 115. For the layer thickness of the individual laser elements $127_2$ and $127_3$, this thus gives rise to the respective relationship $s_2=u*\lambda/2$, $s_3=n*\lambda/2$, where u and n are each natural numbers. The wavelength specified here in each case always relates to the wavelength in the corresponding semiconductor medium, i.e. the effective wavelength.

The layer thickness of the individual laser elements $127_1$, $127_2$, $127_3$ can be in each case identical or different from one another. If the layer thickness $S_2$ of the second laser element $127_2$ and the layer thickness $S_3$ of the third laser element $127_3$ satisfy the relationship specified above, the first and second connection layers $128_1$, $128_2$ can represent loss channels for all amplified wavelengths apart from the target wavelength. By way of example, the first and second connection layers $128_1$, $128_2$ can be embodied as an absorbent tunnel junction. Given this dimensioning, nodes of the standing wave are positioned in each case at the position of the tunnel junctions. Accordingly, absorption of laser modes with a wavelength that deviates from the target wavelength occurs. As a consequence, it is possible for the emission wavelength to remain virtually constant in the event of temperature variations, even though the gain peak amplification varies.

The second resonator mirror 146 has for example a reflectivity which is lower than 100%. The first resonator mirror 144 has a higher reflectivity than the second resonator mirror 146. In accordance with further embodiments, the second resonator mirror 146 can also have a higher reflectivity than the first resonator mirror 144.

In accordance with the embodiments described here, the absorber layers 143 and the transparent dielectric layers 142 can be applied for example epitaxially or else subsequently, for example by means of sputtering, vapor deposition and the like. By way of example, the absorber layer 143 can contain a few monolayers of an absorbent material, for example germanium.

Figure 4A:
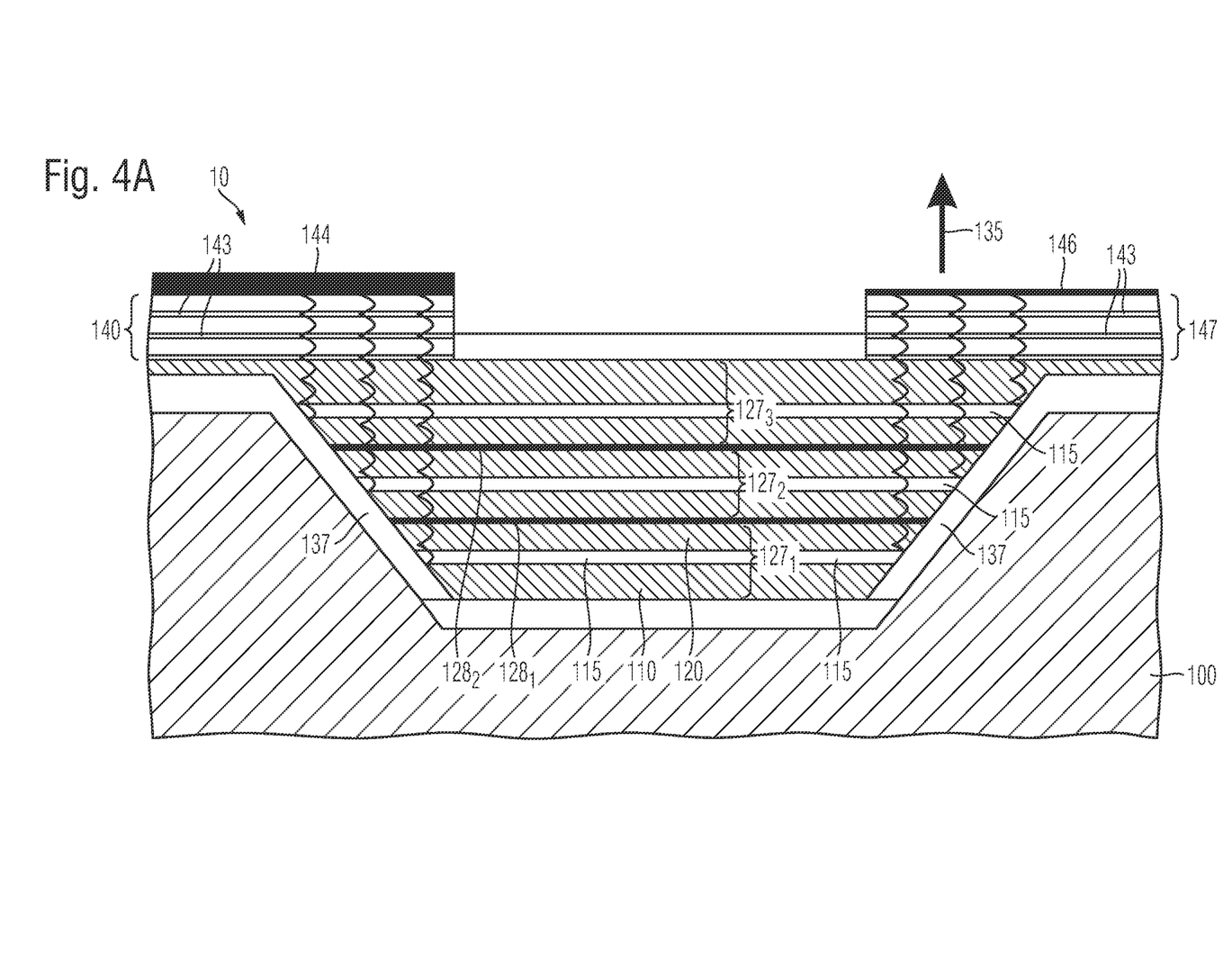
FIG. 4A shows a cross-sectional view of a semiconductor laser in accordance with further embodiments.

FIG. 4A shows a cross-sectional view of a semiconductor laser 10 in accordance with embodiments. The semiconductor laser shown in FIG. 4A has the components illustrated in FIGS. 3A and 3B. The absorption element 140 is arranged between the first resonator mirror 144 and the semiconductor layer arrangement 112. The absorption element 140 is furthermore arranged between the second resonator mirror 146 and the semiconductor layer arrangement 112. Electromagnetic radiation 135 generated is output via the second resonator mirror 146.

By way of example, the material of the first and second semiconductor layers 110, 120 and also of the active zone can be based on the GaAs material system and can contain GaAs semiconductor layers. In this case, the connection layers $128_1$, $128_2$ can have a tunnel junction containing highly doped AlGaAs, for example AlGaAs doped with tellurium or with carbon. In accordance with further embodiments, the tunnel junction can comprise highly doped GaAs that is doped with tellurium or carbon, for example. The layer thickness of the tunnel junction can be less than $\lambda/2$, for example, where $\lambda$ corresponds to the effective wavelength in the corresponding propagation medium.

In accordance with further embodiments, one of the absorber layers 140, for example between the semiconductor layer arrangement 112 and the second resonator mirror 146 or between the semiconductor layer arrangement 112 and the first resonator mirror 144, can be dispensed with.

Figure 4B:
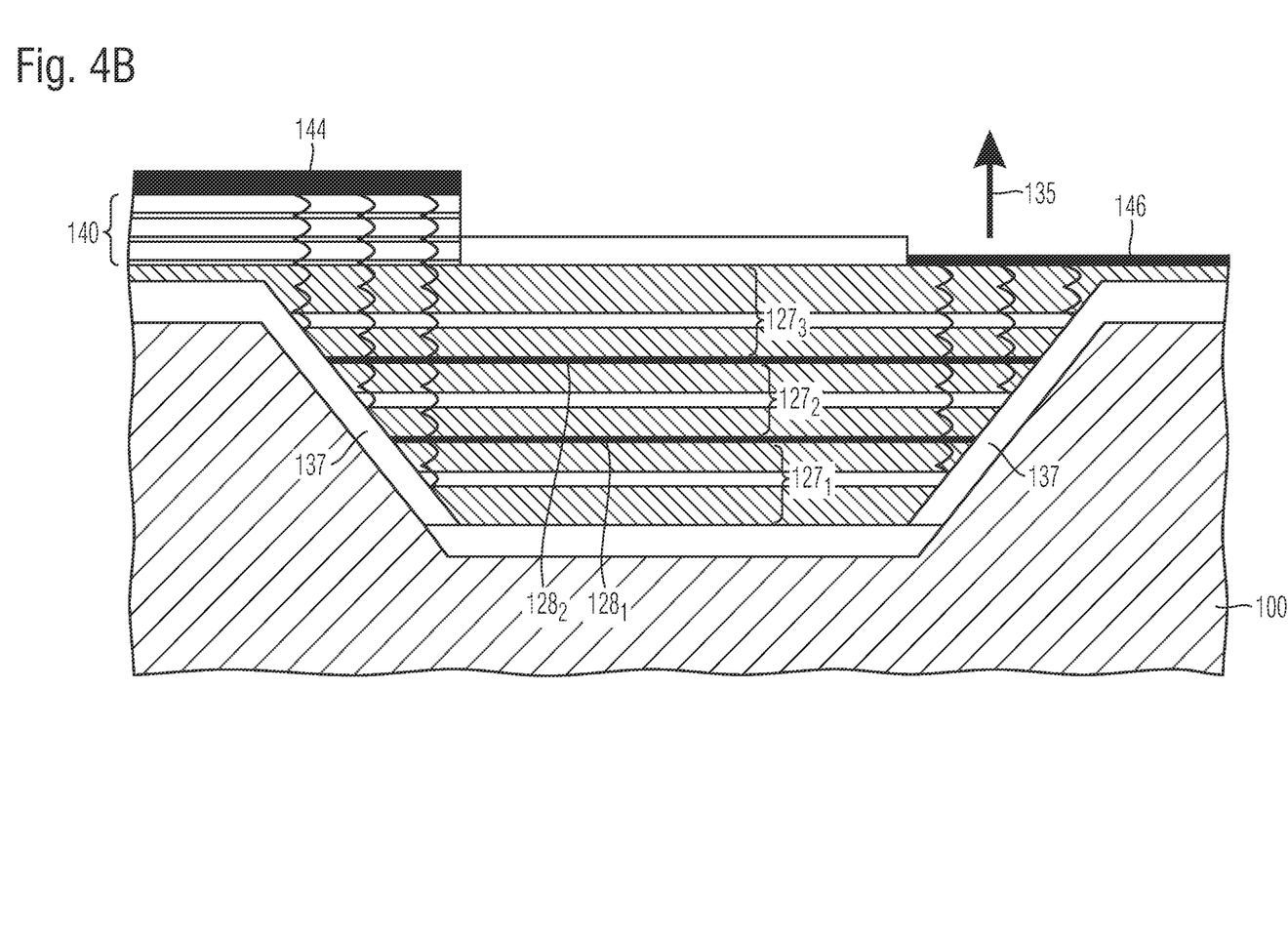
FIG. 4B shows a cross-sectional view of a semiconductor laser in accordance with further embodiments.

FIG. 4B shows a cross-sectional view of a semiconductor laser in accordance with embodiments in which an absorption element 140 is arranged between the semiconductor layer arrangement 112 and the first resonator mirror 144 in the manner described above. By contrast, no absorption element 140 is arranged between the second resonator mirror 146 and the semiconductor layer arrangement 112. By way of example, the second resonator mirror 146 directly adjoins the semiconductor layer arrangement 112. Electromagnetic radiation 135 generated is output via the second resonator mirror 146.

Figure 4C:
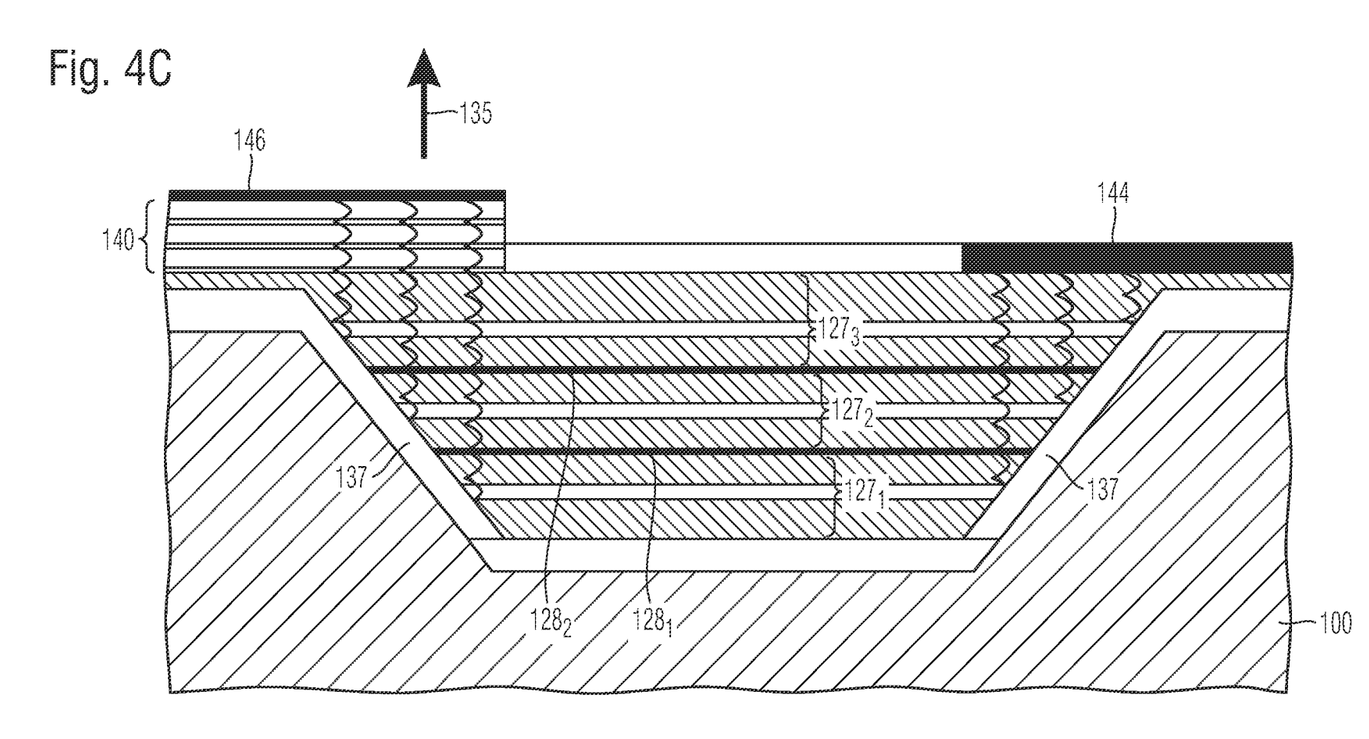
FIG. 4C shows a cross-sectional view of a semiconductor laser in accordance with further embodiments.

FIG. 4C shows an example in which the absorption element 140 is arranged between the second resonator mirror 146 and the semiconductor layer arrangement 112. By contrast, no absorption element 140 is arranged between the first resonator mirror 144 and the semiconductor layer arrangement 112. By way of example, the first resonator mirror 144 directly adjoins the semiconductor layer arrangement 112. Electromagnetic radiation 135 generated is output via the second resonator mirror 146.

As has been described, it is possible, by using a wavelength-selective absorption element between semiconductor layer arrangement and resonator mirror, to provide a semiconductor laser having improved temperature stability. As a result, it is possible to increase the performance of a system in which the semiconductor laser is used. Furthermore, the semiconductor laser described is producible in a cost-effective manner.

Figure 5:
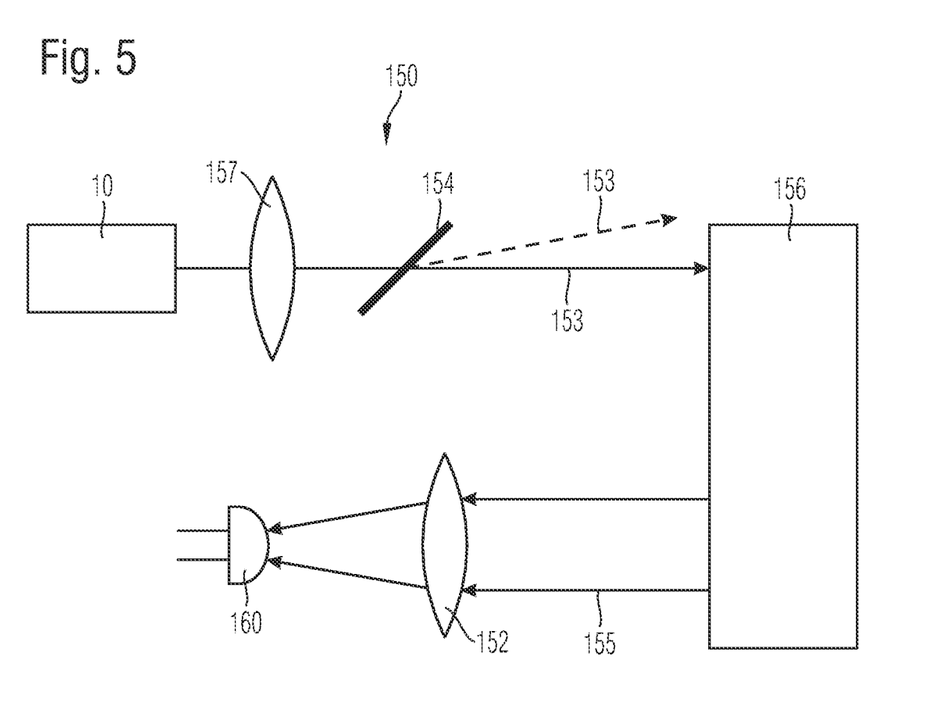
FIG. 5 shows a schematic view of a LIDAR system in accordance with embodiments.

FIG. 5 shows a schematic arrangement of a LIDAR system 150 in which the semiconductor laser 10 described can be used. The, typically pulsed, laser radiation emitted by the semiconductor laser 10 is emitted for example through a collimator optical unit 157 and a deflection/scanning unit 154. The object beam 153 is incident on an object 156 and reflected by the latter. The reflected beam 155 arises in the process. The reflected beam 155 is fed to a detector 160 through a receiving optical unit 152. The distance of the object 156 can be determined from the temporal difference between the emission of the laser pulse and the reception of the laser pulse.

By virtue of the fact that the semiconductor laser can be operated at a stable wavelength even at variable temperatures, it is possible to use a narrowband detector. By way of example, the detector can use a narrow wavelength window that is smaller than 10 nm or than 5 nm or even smaller than 1 nm.

As a result, the influence of the insolation can be reduced and the signal-to-noise ratio can be increased. As a result, lower powers of the laser are required in order to measure the same distances, for example. Or with the power remaining the same, the range of the system can be increased. As a result, the performance of the system is increased overall. Furthermore, the laser can be operated with less power in order to carry out the same measurements with a constant signal-to-noise ratio. As a result, the energy consumption is reduced. Furthermore, the semiconductor laser described can be produced cost-effectively in a simple manner.

The semiconductor laser described can also be used in other applications. By way of example, the semiconductor laser can be used in the field of metrology, sensor technology and in applications requiring temperature-stable wavelengths, for example in display devices, in which little color drift is desirable.

Although specific embodiments have been illustrated and described herein, those skilled in the art will recognize that the specific embodiments shown and described can be replaced by a multiplicity of alternative and/or equivalent configurations, without departing from the scope of protection of the invention. The application is intended to cover any adaptations or variations of the specific embodiments discussed herein. Therefore, the invention is restricted only by the claims and the equivalents thereof.

The invention claimed is:

1. A semiconductor laser comprising
   a semiconductor layer arrangement having an active zone for generating radiation,
   a first resonator mirror, a second resonator mirror and a resonator arranged between the first and second resonator mirrors, said resonator extending in a direction parallel to a first main surface of the semiconductor layer arrangement, and
   a first wavelength-selective absorption element arranged between the semiconductor layer arrangement and the first resonator mirror,
   wherein the first wavelength-selective absorption element has an absorber layer arranged at a position corresponding to the position of a node of the electric field strength at a target wavelength,
   wherein an amount of radiation absorbed by the absorber layer is based on a temperature of the semiconductor layer, and
   the first wavelength-selective absorption element furthermore has a transparent dielectric layer between the first resonator mirror and the absorber layer, wherein the transparent dielectric layer is dimensioned in such a way that a node of a standing wave that forms with the target wavelength is arranged in the absorber layer, wherein a plane of the transparent dielectric layer and of the absorber layer extends perpendicular to a light propagation direction.

2. The semiconductor laser as claimed in claim 1, furthermore comprising a second wavelength-selective absorption element arranged between the semiconductor layer arrangement and the second resonator mirror.

3. The semiconductor laser as claimed in claim 1, wherein the first wavelength-selective absorption element has a plurality of absorber layers, wherein an optical distance between centers of at least two adjacent absorber layers corresponds in each case to an integer multiple of half the target wavelength in the transparent dielectric layer arranged between the absorber layers.

4. The semiconductor laser as claimed in claim 1, wherein a material of the absorber layer contains germanium or the absorber layer is realized as a tunnel junction.

5. The semiconductor laser as claimed in claim 1, wherein the transparent dielectric layer contains $SiO_2$, SiN, ZnSe or a transparent III-V semiconductor material.

6. The semiconductor laser as claimed in claim 1, wherein for the target wavelength at a predefined temperature a maximum gain is present within the active zone.

7. The semiconductor laser as claimed in claim 1, wherein the semiconductor layer arrangement has a multiplicity of laser elements.

8. The semiconductor laser as claimed in claim 7, wherein the laser elements are connected to one another via at least one absorbent connection layer.

9. The semiconductor laser as claimed in claim 8, wherein the at least one absorbent connection layer is arranged at a position corresponding to a position of a node of the electric field strength at the target wavelength.

10. The semiconductor laser as claimed in claim 8, wherein the at least one absorbent connection layer is realized by a tunnel junction.

11. The semiconductor laser as claimed in claim 1, wherein lateral boundaries of the semiconductor layer arrangement run obliquely, such that generated electromagnetic radiation is reflected in the direction of the first main surface of the semiconductor layer arrangement, and the first and second resonator mirrors are arranged over the first main surface of the semiconductor layer arrangement.

12. The semiconductor laser as claimed in claim 11, wherein the first wavelength-selective absorption element is arranged between the first main surface and the first resonator mirror.

13. The semiconductor laser as claimed in claim 12, wherein the first wavelength-selective absorption element extends over the first main surface and is furthermore arranged between the first main surface and the second resonator mirror.

14. The semiconductor laser as claimed in claim 11, wherein the semiconductor layer arrangement has a multiplicity of laser elements and also at least one absorbent connection layer, wherein a layer thickness s2 of at least one laser element as measured in a vertical direction satisfies the relationship $s2 = u*\lambda/2$, where u is a natural number and $\lambda$ indicates the wavelength in the semiconductor layers of the laser element.

15. A LIDAR system comprising the semiconductor laser as claimed in claim 1.

16. The semiconductor laser as claimed in claim 1, wherein, if the semiconductor laser is operated at the target wavelength, no absorption occurs in the absorber layer and, if there is a shift in the wavelength as temperature increases, increased absorption for this wavelength occurs in the absorber layer.

17. The semiconductor laser as claimed in claim 1, wherein a reflectivity of the second resonator mirror is different than a reflectivity of the first resonator mirror.

18. The semiconductor laser as claimed in claim 17, wherein the reflectivity of the second resonator mirror is lower than the reflectivity of the first resonator mirror and the radiation that is generated is coupled out the second resonator mirror.

19. The semiconductor laser as claimed in claim 17, wherein the reflectivity of the second resonator mirror is higher than the reflectivity of the first resonator mirror and the radiation that is generated is coupled out the first resonator mirror.

20. The semiconductor laser as claimed in claim 1, wherein the semiconductor layer arrangement comprises a first semiconductor layer of a first conductivity type and a second semiconductor layer of a second conductivity type.

* * * * *